United States Patent Office 3,070,587
Patented Dec. 25, 1962

3,070,587
POLYMERIZATION OF CONJUGATED DIOLEFINS IN THE PRESENCE OF TiCl$_4$, AlR$_3$ AND O$_2$
Robert P. Zelinski, Bartlesville, Okla., assignor to Phillips Petroleum Company, a corporation of Delaware
No Drawing. Filed June 16, 1958, Ser. No. 742,029
6 Claims. (Cl. 260—94.3)

This invention relates to the polymerization of conjugated dienes. In one aspect, the invention relates to a novel process for polymerizing conjugated dienes wherein high conversions of the diene to rubbery polymers are obtained.

Natural rubber has long been employed in a variety of applications, a particularly important one being in the manufacture of automobile tires. Since rubber-like materials can be obtained from the milky juice of many varieties of rubber trees and plants, many different forms of natural rubber are described in the literature. The most widely used rubber latex is that gathered from the tree *Hevea brasiliensis*. Because of the shortage of natural rubber caused by the recent war, many varieties and types of synthetic rubber have been developed and produced. In this regard, both mass and emulsion polymerization techniques have been used for preparing synthetic rubber on a commercial scale. For many uses, certain synthetic rubbers are vastly superior to natural rubber while for other uses natural rubber possesses properties superior to those of synthetic rubber, thereby necessitating at the present time the import and use of large amounts of natural rubber. One of the outstanding properties of natural rubber which is lacking in synthetic rubber is the property of tack. Because of this property of tack, plies of natural rubber when pressed together adhere to one another without the use of an adhesive. Another important and desirable property of natural rubber is that of low hysteresis. Because many synthetic rubbers on the other hand exhibit high hysteresis, i.e., high heat build-up, they are often inferior to natural rubber for certain uses, e.g., in the manufacture of truck tires.

A great amount of work has been carried on to determine the chemical structure of natural rubber and to try to synthesize this material. It is generally accepted today that natural rubber is substantially a cispolymer of isoprene (2-methyl-1,3-butadiene) although attempts to produce this polymer synthetically have not in the past been too successful. Recently, it has been discovered that a cis 1,4-polyisoprene can be produced by contacting isoprene with a catalyst comprising an organoaluminum compound and titanium tetrachloride. This catalyst is also effective in producing polymers of conjugated dienes other than isoprene. For example, the catalyst can be used to produce a polymer of 1,3-butadiene in which more than 90 percent of the polymer is formed by 1,4-addition of the butadiene. The instant invention is concerned with an improvement in a process for polymerizing conjugated dienes in which the aforementioned catalyst is utilized.

It is an object of this invention to provide a novel method for polymerizing conjugated dienes to linear, rubbery polymers.

Another object of the invention is to provide a process for polymerizing conjugated dienes in which high conversions of the dienes to rubbery polymers are obtained.

A further object of the invention is to provide a process for producing cis 1,4-polyisoprene wherein high conversions are obtained and the polymer product has a desirable molecular weight.

Other and further objects and advantages of the invention will become apparent to those skilled in the art upon consideration of the accompanying disclosure.

It has now been discovered that greater conversions of monomer to polymer can be obtained in a polymerization reaction in which a monomeric material comprising conjugated diene is polymerized by contacting same with a catalyst comprising an organoaluminum compound and titanium tetrachloride by conducting the polymerization in the presence of oxygen. This is preferably accomplished by injecting a small amount of oxygen into the reaction zone at the beginning of the polymerization. While the instant invention is broadly applicable to the polymerization of conjugated dienes, it is especially applicable to the polymerization of isoprene. Isoprene polymerizes at a much slower rate than does 1,3-butadiene, the conjugated diene most widely used in the manufacture of synthetic rubber. Since a rubbery polymer having substantially the same structure as natural rubber is produced when isoprene is polymerized in the presence of the above-described catalyst, it becomes very important to provide a process such as the instant process in which the reaction rate of isoprene polymerization is greatly increased.

The organoaluminum compound used with titanium tetrachloride in the catalyst system of this invention corresponds to the formula R$_3$Al, wherein R is an alkyl, aryl, alkaryl, aralkyl, cycloalkyl, cycloalkylalkyl, or alkylcycloalkyl. The R in the formula preferably contains from 1 to 20, inclusive, carbon atoms. Examples of these compounds include trimethylaluminum, triethylaluminum, triisobutylaluminum, tri-n-decylaluminum, tri-sec-eicosylaluminum, tribenzylaluminum, triphenylaluminum, trinaphthylaluminum, tri-p-tolylaluminum, tricyclohexylaluminum, tri(4 - methylcyclohexyl)aluminum, tri(4-butylcyclohexyl)aluminum, tri(4-cyclohexylbutyl)aluminum, and the like.

The process of this invention is carried out in the presence of a diluent which is relatively inert, non-deleterious and liquid under the reaction conditions of the process. The lower molecular weight paraffins, such as propane, butane, pentane, and hexane are especially useful when the process is carried out at low temperatures. However, the higher molecular weight paraffins and cycloparaffins, such as isooctane, cyclohexane and methylcyclohexane can also be used, and it is often preferred to employ aromatic diluents, such as benzene, toluene, and the like. Mixtures of these diluents can also be employed.

The polymerization process of this invention can be practiced at any temperature within the range of —100 to 100° C., but it is preferred to operate in the range of —50 to 75° C. The polymerization reaction can be carried out under autogeneous pressures. It is usually desirable to operate at pressures sufficient to maintain the monomeric material substantially in the liquid phase. The pressure will thus depend upon the particular material being polymerized, the diluent being employed, and the temperature at which the polymerization is carried out. However, higher pressures can be employed if desired, these pressures being obtained by some such suitable method as the pressurization of the reactor with a gas which is inert with respect to the polymerization reaction.

The total amount of catalyst, i.e., the organoaluminum compound plus titanium tetrachloride, which is used in the polymerization can vary over a rather wide range. The concentration of the total catalyst composition is usually in the range of about 0.01 weight percent to 15.0 weight percent or higher based on the amount of monomeric material charged to the polymerization reactor. The mol ratio of titanium tetrachloride to the organoaluminum compound is usually in the range of 0.05 to 20, preferably between 0.1 and 3.0.

As previously mentioned, the polymerization of this invention is broadly applicable to the preparation of rubbery polymers from a monomeric material comprising any of the conjugated dienes. However, it is preferred to utilize a conjugated diolefin containing from 4 to 8, inclusive, carbon atoms per molecule, and the process is particularly applicable to the polymerization of isoprene. Examples of conjugated diolefins other than isoprene which can be polymerized according to this invention include 1,3-butadiene, 2,3-dimethyl-1,3-butadiene, 2-methyl-1,3-pentadiene, 2,3-dimethyl-1,3-pentadiene, 2-methyl-3-ethyl-1,3,-pentadiene, 2-phenylbutadiene, and the like.

The instant invention is also applicable to the polymerization of conjugated dienes in admixture with each other and/or with one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene and 1-octene. Branched chain olefins, such as isobutylene, can be used as well as 1,1-dialkyl-substituted and 1,2-dialkyl-substituted ethylenes, such as butene-2, pentene-2, hexene-2, heptene-2, 2-methylbutene-1, 2-methylhexene-1, 2-ethylheptene-1, and the like. Other olefins which can be employed include di- and polyolefins, such as 1,5-hexadiene, 1,4-pentadiene, and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonitrile, methyl acrylate, methyl methacrylate, vinyl acetate, vinyl chloride, 2-methyl-5-vinylpyridine, 2-vinylpyridine, 4-vinylpyridine, and the like.

The oxygen which is injected into the reaction medium according to the process of this invention can be supplied as oxygen or as a mixture of oxygen with other gases. Air is an example of an oxygen-containing gas which can be advantageously employed. The amount of oxygen which is used will vary, depending upon the amount of catalyst, the reaction temperature, and other variables. However, the mol ratio of the total catalyst composition to oxygen is within the range of 6 to 20. It has been found that mol ratios greater than 20 do not bring about the desired higher conversions and that the polymerization cannot be effected when the mol ratio is less than 6.

The reason that the presence of oxygen brings about higher conversions of diene monomer to polymer is not completely understood. However, it has been found that by proceeding in accordance with the present process two very desirable advantages are obtained. For example, when isoprene is polymerized with the catalyst described herein in the absence of oxygen, the polymerization rate is quite slow, often requiring several days to reach high conversions, i.e., 90 percent and higher. Furthermore, the molecular weight of the polymer which is formed in such a process is not as high as is usually desirable for synthetic rubber. While the molecular weight can be increased by decreasing the total amount of catalyst present, such a procedure results in a further decrease in the polymerization rate which is already at an undesirable level. When oxygen is used according to the process of this invention, not only is the polymerization rate increased, but a higher molecular weight product is also formed. Thus, for a given total amount of catalyst, a higher conversion of diene monomer to rubbery polymer is realized when oxygen is used, and the molecular weight of this product is higher than when the polymerization is conducted in the absence of added oxygen or oxygen-containing gas.

The process of this invention can be carried out as a batch process by charging the monomeric material into a reactor containing catalyst, diluent and oxygen or oxygen-containing gas. In this regard, it is usually preferred to inject the oxygen into the diluent-catalyst mixture prior to addition of the conjugated diene. While the oxygen or oxygen-containing gas can be injected shortly after the charging of the monomer, it is important that the oxygen be present in the reaction zone before any substantial polymerization has occurred. It is also within the scope of the invention to carry out the process in a continuous manner. When carrying out the process continuously, the catalyst components are charged to a catalyst preparation vessel containing diluent, and the oxygen or oxygen-containing gas is thereafter injected into this vessel. The resulting catalyst-diluent mixture containing oxygen is thereafter passed from the catalyst preparation vessel into the polymerization reactor at the same time as the monomer and the diluent are charged to the reactor. The residence time in a continuous process will vary within rather wide limits depending upon such variables as temperature, pressure, the particular catalyst used, and the conjugated diene to be polymerized. In a continuous process, the residence time usually falls within the range of one second to one hour when conditions within the specified ranges are utilized. When a batch process is being employed, the time for the reaction can be as high as 24 hours or more. However, it is to be remembered that the instant process for any given residence time provides a higher conversion than a process in which oxygen is not used in the manner described herein. It is also within the purview of the invention to utilize an antioxidant in the process of this invention to prevent oxidation of the rubbery polymer. The antioxidant can be advantageously added to the reaction mixture prior to precipitation of the polymer.

As mentioned hereinbefore, this invention is applicable to the production of rubbery polymers. The term "rubbery polymer" includes elastomeric, vulcanizable polymeric material which after vulcanization, i.e., crosslinking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. The rubbery polymers produced in accordance with this invention are linear polymers. With regard to the solubility of the rubbery polymers, they contain less than 50 percent gel as determined by the standard gel determination test. The rubbery polymers of this invention can be compounded by any of the known methods such as have been used in the past for compounding natural rubber. Vulcanization accelerators, reinforcing agents and fillers, such as have been employed in natural rubber, can likewise be utilized when compounding the polymers of this invention.

A more comprehensive understanding of the invention can be obtained by referring to the following illustrative examples which are not intended, however, to be unduly limitative of the invention.

EXAMPLE I

Isoprene was polymerized to rubbery polymer in the presence of a system consisting of triisobutylaluminum and titanium tetrachloride. In this experiment, two runs were carried out in the absence of oxygen, while one run was conducted in the presence of added oxygen.

In these runs, toluene was bubbled with prepurified nitrogen in a one-gallon bottle at 3 liters per minute for 30 minutes. The desired amount of toluene was then charged to a 6-ounce beverage bottle, and this toluene was bubbled with nitrogen at 3 liters per minute for 3 minutes. The bottle was then sealed with a neoprene seal and a crown bottle cap which was punched so as to expose a portion of the neoprene seal. The desired amount of triisobutylaluminum was then charged to the bottle by means of a syringe as a 0.338 molar solution in toluene. The desired amount of titanium tetrachloride was next charged by means of a syringe, this material being charged as a 0.294 molar solution in cyclohexane. Following this latter charge, the desired amount of isoprene was introduced by means of a syringe. In the run in which oxygen was used, the oxygen was charged immediately after introduction of the isoprene.

At the end of the polymerization period, 2 percent by weight of phenyl-beta-naphthylamine, based on the polymer, was added to the polymer solution in each bottle. Thereafter, the polymer was precipitated from solution by adding an excess of isopropyl alcohol. The precipitated polymer was then dried in a vacuum oven.

The polymerization runs were carried out according to the following recipe:

Recipe

Parts by weight except as noted

| | |
|---|---|
| Isoprene | 100 |
| Toluene | 433 |
| Triisobutylaluminum (TBA) _____millimoles | [1] 3.5 |
| Titanium tetrachloride (TTC) _____do | [1] 3.9 |
| Temperature, °C | 30 |
| Time, hours | 40 |

[1] Per 100 parts of isoprene.

The results of the polymerization runs which were carried out according to the above recipe are set forth below in Table I.

TABLE I

| Run No. | Oxygen | | Conversion, percent | Inherent viscosity |
|---|---|---|---|---|
| | Millimoles | Total catalyst/oxygen mole ratio | | |
| 1 | 0 | 0 | 46 | 2.14 |
| 2 | 0 | 0 | 47 | Not meas. |
| 3 | [1] 1.0 | 7.4 | 84 | 2.68 |

[1] Per 100 parts of isoprene.

Runs 1 and 2 of the above table were carried out in order to show the conversion in polymerization runs in which oxygen was not used. It is also of interest to note that runs 1 and 2 are within 1 percent of each other in conversion. In run 3, the conversion was much higher than in runs 1 and 2 because of the presence of the oxygen. The increase in molecular weight of the polymer of run 3 is demonstrated by the higher inherent viscosity of this material as compared to that of the product of run 1.

EXAMPLE II

Additional polymerization runs were carried out according to the procedure of Example I. The following polymerization recipe was used in these runs.

Recipe

| | Parts by weight except as noted | |
|---|---|---|
| | A | B |
| Isoprene | 100 | 100. |
| Toluene | 433 | 433. |
| Oxygen | 0.6 millimoles [1] | 0. |
| Triisobutylaluminum | 2.5 millimoles [1] | 2.5 millimoles.[1] |
| Titanium tetrachloride | 2.76 millimoles [1] | 2.78 millimoles.[1] |
| Temperature, °C | 30 | 30. |
| Time, hours | 65 | 65. |

[1] Per 100 parts of isoprene.

The results of these runs are shown below in Table II.

TABLE II

| Run No. | Recipe | Total catalyst/oxygen mole ratio | Conversion, percent | Inherent viscosity | Gel, percent | Swelling index of gel |
|---|---|---|---|---|---|---|
| 4 [1] | A | 8.81 | 75 | 3.08 | 41 | 93 |
| 5 | B | 0 | 45 | | | |

[1] The polymer expressed here as run 4 is a composite of 9 polymerization runs which were made according to Recipe A.

The molecular weight of the polymer from Recipe A is quite high as indicated by its inherent viscosity. Although the percent gel is high in this polymer, it is to be noted that this is a loose gel as indicated by the high swelling index. Such a gel can be readily broken down during milling and processing of the rubber.

EXAMPLE III

Still another series of polymerization runs was conducted according to the procedure of Example I. The polymerization recipe for these runs was as follows:

Recipe

| | Parts by weight except as noted | |
|---|---|---|
| | A | B |
| Isoprene | 100 | 100. |
| Toluene | 433 | 440. |
| Oxygen | Variable | Variable. |
| Triisobutylaluminum | 2.5 millimoles [1] | 2.5 millimoles.[1] |
| Titanium tetrachloride | 2.78 millimoles [1] | 2.78 millimoles.[1] |
| Temperature, °C | 30 | 30. |
| Time, hours | 19 | 24. |

[1] Per 100 parts of isoprene.

The results of these runs are set forth below in Table III. The charge order in runs 7 to 10, 12 and 13 was the same as in Example I except that the oxygen was charged just prior to the introduction of the isoprene. In runs 6 and 11, the polymerization was carried out in the absence of oxygen.

TABLE III

| Run No. | Recipe | Oxygen, millimoles | Total catalyst/oxygen mole ratio | Conversion, percent | Inherent viscosity |
|---|---|---|---|---|---|
| 6 | A | 0 | | 67 | 2.59. |
| 7 | A | 0.25 | 21.1 | 68 | 2.89. |
| 8 | A | 0.50 | 11.55 | 71 | 3.27. |
| 9 | A | 0.75 | 7.05 | 93 | 4.08. |
| 10 | A | 1.0 | 5.28 | 0 | |
| 11 | B | 0 | | 60 | Not meas. |
| 12 [1] | B | 0.6 | 8.8 | 67 | Not meas. |
| 13 [1] | B | 0.8 | 6.59 | 74 | Not meas. |

[1] In these runs, the triisobutylaluminum was charged as an 0.441 molar solution in toluene.

The rubbery polymers produced in accordance with this invention have utility in applications where natural and synthetic rubbers are used. They can be used in the manufacture of automobile tires and other rubber articles, and are particularly useful in applications requiring a rubber exhibiting a high degree of tack.

As will be evident to those skilled in the art, many variations and modifications of the invention can be practiced in view of the foregoing disclosure. Such variations and modifications are clearly believed to come within the scope of the invention.

I claim:

1. In a process for the polymerization of isoprene to form a rubbery polymer which comprises contacting isoprene under polymerization conditions in the presence of a hydrocarbon diluent with a catalyst consisting essentially of (1) an organoaluminum compound corresponding to the formula $R_3Al$, wherein R is a radical selected from the group consisting of alkyl, aryl, alkaryl, aralkyl, cycloalkyl, cycloalkylalkyl, and alkylcycloalkyl, and (2) titanium tetrachloride, the mol ratio of said titanium tetrachloride to said organoaluminum compound being about 1:1, the improvement which comprises conducting said polymerization in the presence of oxygen, the mol ratio of said catalyst to oxygen being in the range of 6 to 20.

2. A process for the polymerization of isoprene to form a rubbery polymer which comprises introducing into a reaction zone a catalyst consisting essentially of (1) an organoaluminum compound corresponding to the formula $R_3Al$, wherein R is a radical selected from the group consisting of alkyl, aryl, alkaryl, aralkyl, cycloalkyl, cycloalkylalkyl, and alkylcycloalkyl, and (2) titanium tetrachloride, the mol ratio of said titanium tetrachloride to said organoaluminum compound being about 1:1; introducing a hydrocarbon diluent into said reaction zone; injecting oxygen into said hydrocarbon diluent contained in said reaction zone, the mol ratio of said catalyst to said oxygen being in the range of 6 to 20; charging isoprene to said reaction zone, said zone being at a temperature in the range of $-100°$ C. to $100°$ C. and at a pressure sufficient to maintain said isoprene substantially in the liquid phase; and recovering the rubbery polymer so produced.

3. The process according to claim 2 in which the concentration of said catalyst in said reaction zone is in the range of about 0.01 to 15.0 weight percent based on the amount of said isoprene.

4. The process according to claim 2 in which said catalyst consists essentially of triisobutylaluminum and titanium tetrachloride.

5. The process according to claim 2 in which said catalyst consists essentially of triethylaluminum and titanium tetrachloride.

6. A process for the polymerization of isoprene to form a rubbery polymer which comprises introducing into a catalyst preparation zone a hydrocarbon diluent and a catalyst consisting essentially of (1) an organoaluminum compound corresponding to the formula $R_3Al$, wherein R is a radical selected from the group consisting of alkyl, aryl, alkaryl, aralkyl, cycloalkyl, cycloalkylalkyl, and alkylcycloalkyl and (2) titanium tetrachloride, the mol ratio of said titanium tetrachloride to said organoaluminum compound introducing into said zone being about 1:1; injecting oxygen into said hydrocarbon diluent contained in said catalyst preparation zone, the mol ratio of said catalyst to oxygen so injected being in the range of 6 to 20; introducing additional hydrocarbon diluent and isoprene into a reaction zone; passing said hydrocarbon diluent containing catalyst and oxygen from said catalyst preparation zone into said reaction zone, the concentration of catalyst in said reaction zone being in the range of about 0.01 to 15.0 weight percent based on the amount of said isoprene; maintaining said reaction zone at a temperature in the range of $-100°$ C. to $100°$ C. and at a pressure sufficient to maintain said isoprene substantially in the liquid phase; and withdrawing from said reaction zone a product stream comprising hydrocarbon diluent and polymer.

References Cited in the file of this patent

UNITED STATES PATENTS

| | | |
|---|---|---|
| 2,822,357 | Brebner | Feb. 4, 1958 |
| 2,832,759 | Nowlin et al. | Apr. 29, 1958 |
| 2,868,771 | Ray | Jan. 13, 1959 |
| 2,868,772 | Ray et al. | Jan. 13, 1959 |
| 2,881,156 | Pilar | Apr. 7, 1959 |
| 2,886,561 | Reynolds et al. | May 12, 1959 |
| 2,953,554 | Miller | Sept. 20, 1960 |

FOREIGN PATENTS

| | | |
|---|---|---|
| 552,462 | Belgium | May 9, 1957 |